United States Patent
Yu et al.

(10) Patent No.: US 12,024,067 B2
(45) Date of Patent: Jul. 2, 2024

(54) ELECTRIC SEAT CONTROL APPARATUS FOR VEHICLE AND CONTROL METHOD THEREFOR

(71) Applicant: AMOTECH CO., LTD., Incheon (KR)

(72) Inventors: Byung Hoon Yu, Incheon (KR); Sang Jin Byeon, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 246 days.

(21) Appl. No.: 17/782,430

(22) PCT Filed: Nov. 16, 2020

(86) PCT No.: PCT/KR2020/016063
§ 371 (c)(1),
(2) Date: Jun. 3, 2022

(87) PCT Pub. No.: WO2021/118083
PCT Pub. Date: Jun. 17, 2021

(65) Prior Publication Data
US 2023/0009607 A1    Jan. 12, 2023

(30) Foreign Application Priority Data
Dec. 9, 2019    (KR) ........................ 10-2019-0162729

(51) Int. Cl.
*H05K 7/20*    (2006.01)
*B60N 2/02*    (2006.01)
(Continued)

(52) U.S. Cl.
CPC ......... *B60N 2/02246* (2023.08); *B60N 2/067* (2013.01); *H02P 23/14* (2013.01)

(58) Field of Classification Search
CPC .......... H02P 23/14; H02P 6/16; H02P 29/027
See application file for complete search history.

(56) References Cited

U.S. PATENT DOCUMENTS

2011/0004357 A1*   1/2011   Mathiowetz ............ H02J 3/381
                                                                   700/295
2016/0280094 A1   9/2016   Frye et al.

FOREIGN PATENT DOCUMENTS

JP    2006347516    12/2006
JP    2009202628    9/2009
(Continued)

OTHER PUBLICATIONS

International Search Report—PCT/KR2020/016063 dated Feb. 3, 2021.

*Primary Examiner* — Muhammad S Islam
(74) *Attorney, Agent, or Firm* — CANTOR COLBURN LLP

(57) ABSTRACT

Provided is an electric seat control apparatus for a vehicle including: a first rail and a second rail mounted at a constant interval on the floor surface of a vehicle body in the forward and rearward directions of a seat; a first movement unit provided with a first motor and mounted between the first rail and the lower surface of the seat to move linearly along the first rail; a second movement unit provided with a second motor and mounted between the second rail and the lower surface of the seat to move linearly along the second rail; and a control unit that simultaneously receives the RPM and a rotational position signal of the first motor and the RPM and a rotational position signal of the second motor to synchronize the RPMs and rotational positions of the first motor and the second motor to match each other.

7 Claims, 5 Drawing Sheets

(51) Int. Cl.
*B60N 2/06* (2006.01)
*H02P 23/14* (2006.01)

(56) References Cited

FOREIGN PATENT DOCUMENTS

| | | |
|---|---|---|
| JP | 2017124674 | 7/2017 |
| KR | 20040106125 | 12/2004 |
| KR | 20190048406 | 5/2019 |

\* cited by examiner

ELECTRIC SEAT CONTROL APPARATUS FOR VEHICLE AND CONTROL METHOD THEREFOR

TECHNICAL FIELD

The present invention relates to an electric seat control apparatus for controlling an electric seat for a vehicle and a control method therefor.

BACKGROUND ART

In general, a seat for a vehicle is provided with a seat driving device capable of automatically adjusting the position and posture of a seat, and the seat driving device includes a height adjusting unit for adjusting the height of a seat, a seat back tilt angle adjusting unit for adjusting the tilt angle of a seat back, and a seat transfer unit for advancing and reversing the seat.

The seat transfer unit includes a first rail part and a second rail part fixed to the floor surface of a vehicle body in the front-rear direction, and a first movement part and a second movement part mounted on the lower surface of the seat and slid along the first rail part and the second rail part.

The seat transfer unit is provided with a first motor and a second motor to independently drive the first movement part and the second movement part, which are installed in the first movement part and the second movement part, wherein the first motor is controlled by a first micro controller unit (MCU), and the second motor is controlled by a second MCU.

In this case, since the first motor and the second motor are individually controlled by the first MCU and the second MCU, synchronization is difficult, and when the first motor and the second motor are not synchronized, forward and reward operations of the seat are not smooth, and overload occurs in the first motor and the second motor.

DISCLOSURE

Technical Problem

Accordingly, an object of the present invention is to provide an electric seat control apparatus for a vehicle and a control method therefor, capable of synchronizing two motors by controlling two motors with one integrated MCU.

Another object of the present invention is to provide an electric seat control apparatus for a vehicle and a control method therefor, capable of protecting a motor by stopping the driving of the motor when it is determined that the motor is overloaded by sensing a current value of the motor, and remove a separate limit switch.

Technical Solution

To attain the objects of the present invention, there is provided an electric seat control apparatus for a vehicle comprising: a first rail and a second rail mounted at a constant interval in the forward and rearward directions of a seat; a first movement unit provided with a first motor and mounted between the first rail and the lower surface of the seat to move linearly along the first rail; a second movement unit provided with a second motor and mounted between the second rail and the lower surface of the seat to move linearly along the second rail; and a control unit that simultaneously receives the RPM and a rotational position signal of the first motor and the RPM and a rotational position signal of the second motor to synchronize the RPMs and rotational positions of the first motor and the second motor to match each other.

An integrated micro controller unit (MCU) may receive an RPM signal of the first motor from a first Hall sensor, a rotational position signal of the first motor from a first angle sensor, an RPM signal of the second motor from a second Hall sensor, and a rotational position signal of the second motor from a second angle sensor, to synchronize the RPMs and rotational positions of the first motor and the second motor to match each other.

The integrated MCU may be integrally provided with at least one of a gate driver, MOSFET, and SMPS.

The integrated MCU receives a signal applied from the first Hall sensor in a first reception unit, receives a signal applied from the first angle sensor in a second reception unit, receives a signal applied from the second Hall sensor in a third reception unit, receives a signal applied from the second angle sensor in a fourth reception unit, synchronizes the rotational positions of the first motor and the second motor by comparing the first reception unit and the third reception unit in a first synchronization unit, and synchronizes the RPMs of the first motor and the second motor by comparing the second reception unit with the fourth reception unit in a second synchronization unit.

The integrated MCU may stop the first motor and the second motor when it is determined that an overcurrent is generated in the first motor or the second motor according to a signal applied from a first current measurement unit measuring a current of the first motor and a signal applied from a second current measurement unit measuring a current of the second motor.

A method of controlling an electric seat may comprise the steps of: receiving an RPM and a rotational position of a first motor by an integrated MCU; receiving an RPM and a rotational position of a second motor by the integrated MCU; comparing the RPMs and rotational positions of the first and second motors in the integrated MCU; and synchronizing the RPMs and rotational positions of the first and second motors in the integrated MCU.

Advantageous Effects

As described above, the electric seat control apparatus of the present invention can improve the synchronization performance of the first motor and the second motor by simultaneously applying the RPM and rotational position signals of the first motor and the RPM and rotational position signals of the second motor to one integrated MCU.

In addition, when overload is generated in any one of the first motor and the second motor by sensing the current values of the first motor and the second motor, the motors are protected by stopping the driving of the first motor and the second motor, and the limit positions of the first motor and the second motor can be grasped by the overload signal of any one of the motors, thereby remove a separate limit switch.

BEST MODE

Figure 1:
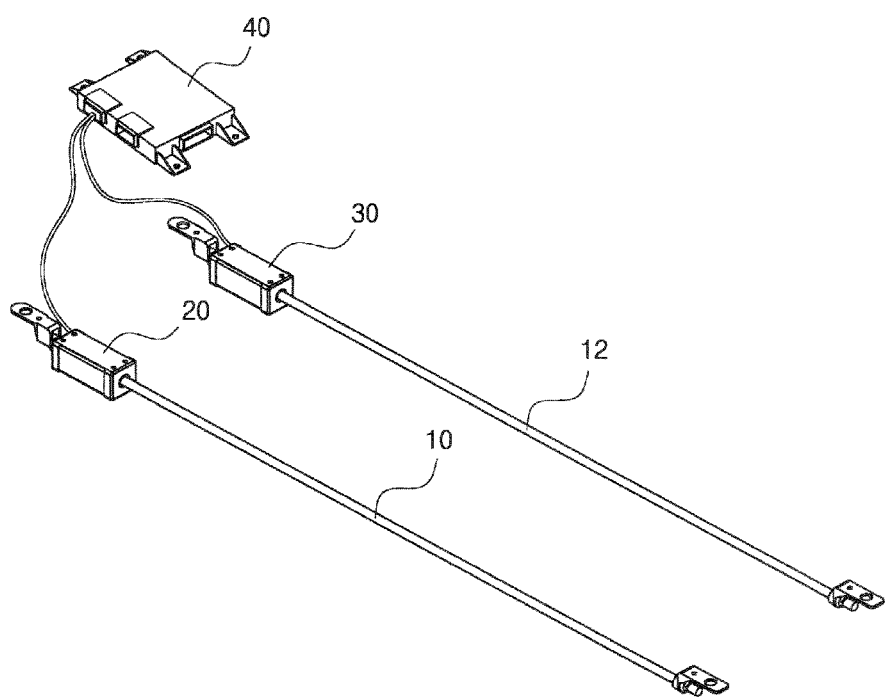
FIG. 1 is a block diagram of an electric seat control apparatus for a vehicle according to an embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

As shown in FIG. 1, the apparatus for controlling an electric seat for a vehicle may include: a first rail 10 and a second rail 12 mounted on the floor of a vehicle body at regular intervals in front and rear directions; a first movement unit 20 mounted between the first rail 10 and the lower surface of the seat to linearly move along the first rail 10 to move the seat back and forth; a second movement unit 30 mounted between the second rail 12 and the lower surface of the seat to linearly move along the second rail 12 to move the seat back and forth; and a control unit 40 controlling the first movement unit 20 and the second movement unit 30.

Figure 2:
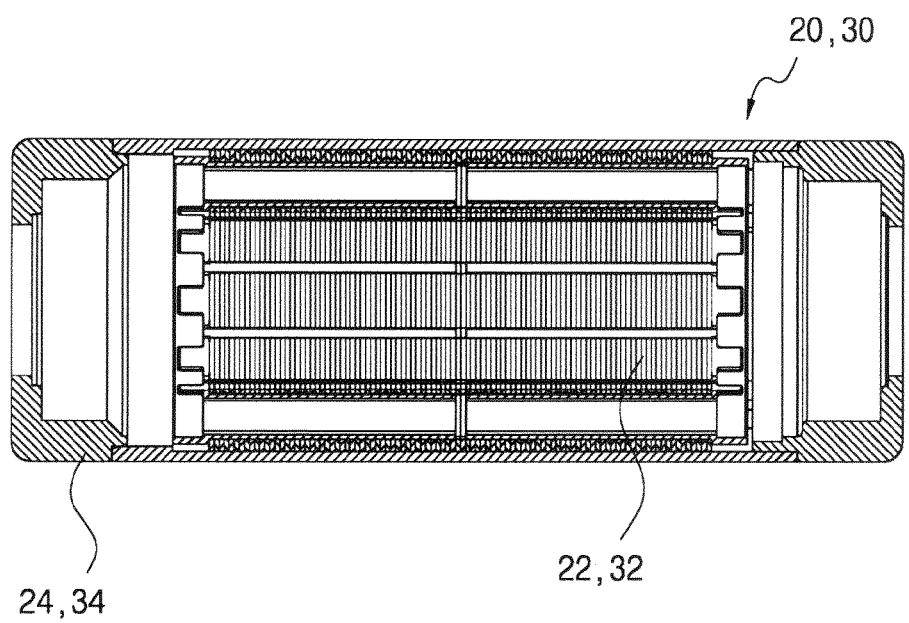
FIG. 2 is a cross-sectional view of a first movement unit and a second movement unit of an electric seat control apparatus for a vehicle according to an embodiment of the present invention.

As illustrated in FIG. 2, the first movement unit 20 may include a first motor 22 that generates a rotational force when power is applied, and a first power transmission unit 24 that converts the rotational force of the first motor 22 into a linear reciprocating motion and moves linearly along the first rail 10.

As shown in FIG. 2, the second movement unit 30 may include a second motor 32 that generates a rotational force when power is applied, and a second power transmission unit 34 that converts the rotational force of the second motor 32 into a linear reciprocating motion and moves linearly along the second rail 12.

The first power transmission unit 24 and the second power transmission unit 34 may employ any structures which are connected to the first rail 10 and the second rail 12 to convert the rotational motions generated by the first motor 22 and the second motor 32 into linear motions to be moved along the first rail 10 and the second rail 12, respectively.

As described above, the electric seat control apparatus is provided with the first rail 10 and the second rail 12 on the lower surface of the seat, and the first rail 10 and the second rail 12 are independently driven by the first motor 22 and the second motor 32 to improve the driving force when the seat is moved back and forth, thereby simplifying the structure and minimizing the simplification and noise generation of the assembly process.

That is, when a single motor is used and two driving units are driven by the single motor, the structure of the power transmission unit for transferring the rotational force of the motor to the two driving units becomes complicated and the risk of failure is increased.

Each of the first motor 22 and the second motor 32 may use a brushless direct-current (BLDC) motor to minimize noise and improve seat driving precision.

The control unit 40 controls the first motor 22 and the second motor 32 to synchronize the first movement unit 20 and the second movement unit 30 to move at the same speed and to the same position when the seat is moved forward and reward. When an overcurrent occurs in the first motor 22 and the second motor 32, the power applied to the first motor 22 and the second motor 32 may be cut off to protect the motors.

Figure 3:
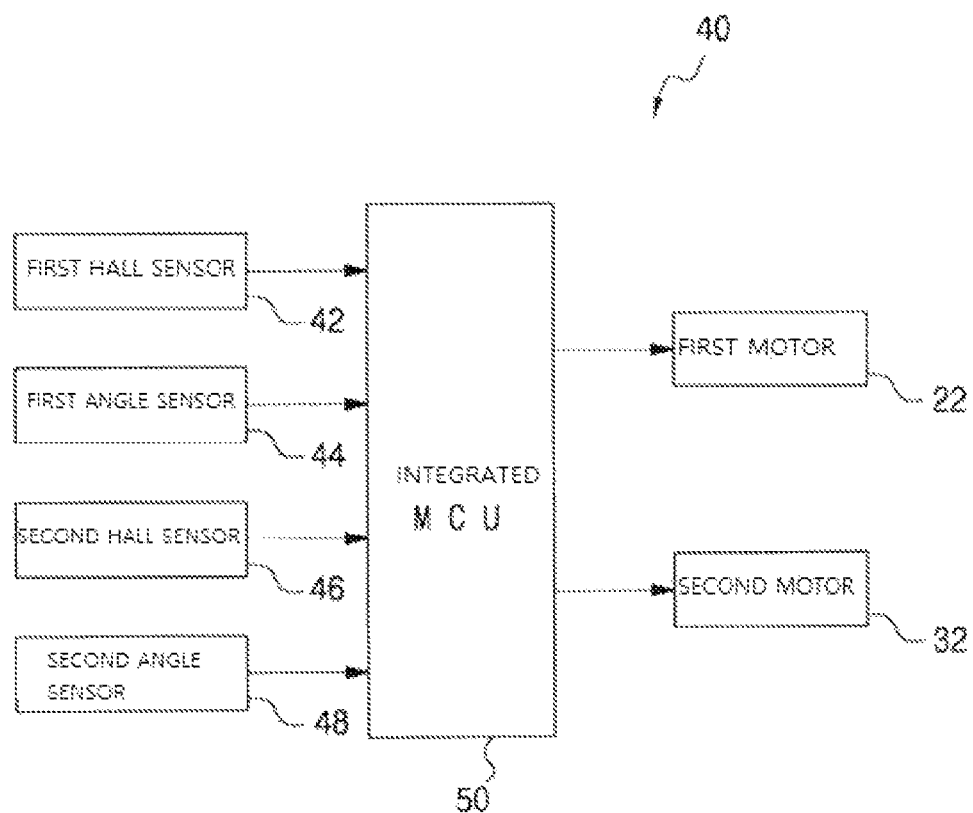
FIG. 3 is a block diagram of an electric seat control apparatus for a vehicle according to an embodiment of the present invention.

As shown in FIG. 3, the control unit 40 includes: a first Hall sensor 42 installed in the first motor 22 to measure the RPM of the first motor 22; a first angle sensor 44 installed in the first motor 22 to sense the rotational position of the first motor 22; a second Hall sensor 46 installed in the second motor 32 to measure the RPM of the second motor 32; a second angle sensor 48 installed in the second motor 32 to sense the rotational position of the second motor 32; and an integrated MCU 50 for receiving all signals from the first Hall sensor 42, the second Hall sensor 46, the first angle sensor 44, and the second angle sensor 48, and for integrating and controlling the first motor 22 and the second motor 32 so that the RPMs and the rotational positions of the first motor 22 and the second motor 32 match each other.

Figure 4:
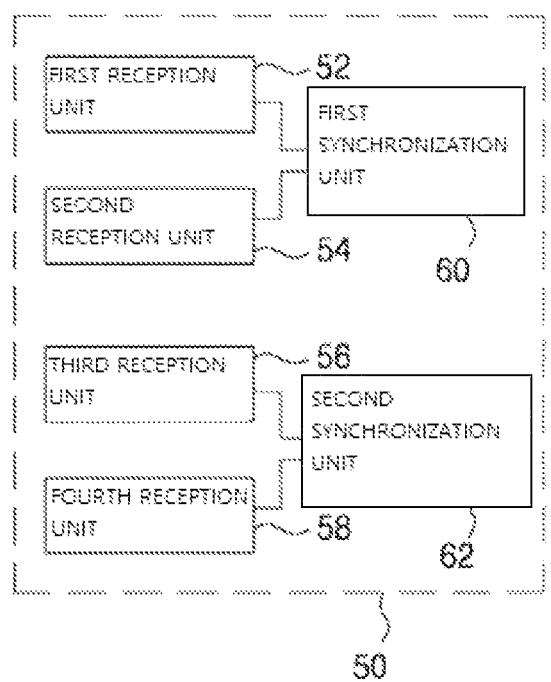
FIG. 4 is a block diagram of an integrated micro controller unit (MCU) of an electric seat control apparatus for a vehicle according to an embodiment of the present invention.

As shown in FIG. 4, the integrated MCU 50 may include: a first reception unit 52 to receive a signal applied from the first Hall sensor 42; a second reception unit 54 to receive a signal applied from the second Hall sensor 46; a third reception unit 56 to receive a signal applied from the first angle sensor 44; a fourth reception unit 58 to receive a signal applied from the second angle sensor 48; a first synchronization unit 60 to compare the first reception unit 52 with the second reception unit 54 to synchronize the rotational positions of the first motor 22 and the second motor 32; and a second synchronization unit 62 to compare the third reception unit 56 with the fourth reception unit 58 to synchronize the RPMs of the first motor 22 and the second motor 32.

The control unit 40 may be integrally provided with a gate driver, a MOSFET transistor, and a switching mode power supply (SMPS) switch.

As described above, the control unit 40 according to the present embodiment receives the positional information and RPM of the first motor 22 and the positional information and RPM of the second motor 32 and synchronizes the positions and speeds of the first motor 22 and the second motor 32 so that the first movement unit 20 and the second movement unit 30 may be aligned at the same speed and the same position.

Figure 5:
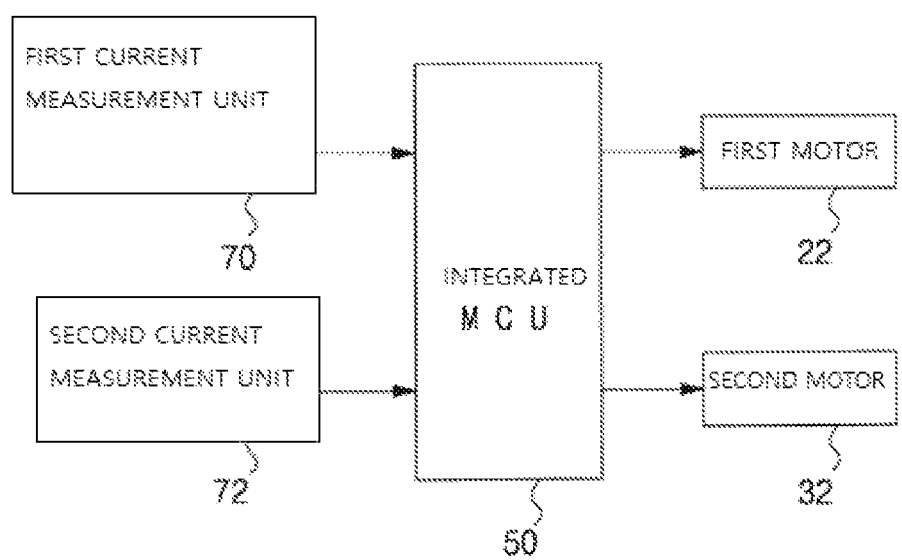
FIG. 5 is a block diagram of an electric seat control apparatus for a vehicle according to another embodiment of the present invention.

As shown in FIG. 5, the control unit 40 may further include a first current measurement unit 70 for measuring the current of the first motor 22 and applying the measured current to the integrated MCU unit 50, and a second current measurement unit 72 for measuring the current of the second motor 32 and applying the measured current to the integrated MCU unit 50.

In the case that the positions of the first motor 22 and the second motor 32 are not matched when the seat is moved forward and reward, the positions of the first movement unit 20 and the second movement unit 30 are deviated from the first rail 10 and the second rail 12, and thus an overcurrent is generated in the first motor 22 and the second motor 32 to cause the first motor 22 and the second motor 32 to be damaged by a fire.

In addition, when the first movement unit 20 and the second movement unit 30 are at a maximum forward position or a maximum reward position of the first rail 10, separate sensors may be provided to detect positions of the first motor 22 and the second motor 32, to stop the first motor 22 and the second motor 32.

In the present embodiment, when the current value of the first motor 22 is applied to the integrated MCU module 50 from the first current measurement unit 70, the integrated MCU unit 50 may compare the current value of the first motor 22 with the set current value to simultaneously stop driving of the first motor 22 and the second motor 32, if it is determined that an overcurrent occurs in the first motor 22.

Similarly, when the current value of the second motor 32 is applied to the integrated MCU 50 from the second current measurement unit 72, the integrated MCU unit 50 may compare the current value of the second motor 32 with the set current value to stop driving of the first motor 22 and the second motor 32, if it is determined that an overcurrent occurs in the second motor 32.

When the position of the first motor 22 and the position of the second motor 32 are deviated from the same position, an overcurrent is generated in the first motor 22 and the second motor 32, and the integrated MCU unit 50 senses the overcurrent to stop driving of the first motor 22 and the second motor 32 to protect the first motor 22 and the second motor 32.

When the seat is moved forward and reward, in the case that the first movement unit 20 and the second movement unit 30 are at a maximum forward position or a maximum reward position of the first rail 10, an overcurrent is generated in the first motor 22 and the second motor 32 and detected by the integrated MCU 50, thereby protecting the first motor 22 and the second motor 32 by stopping the operation of the first motor 22 and the second motor 32.

Hereinafter, a method of controlling an electric seat according to an embodiment of the present invention will be described in detail.

When a vehicle passenger operates the forward and reward switches of the seat, power is applied to the first motor 22 and the second motor 32 to move the seat forward and reward.

In this case, the signal of the first Hall sensor 42 of the first motor 22 is applied to the first reception unit 52 of the integrated MCU 50, and the signal of the second Hall sensor 46 of the second motor 32 is applied to the second reception unit 54 of the integrated MCU 50.

The first synchronization unit 60 of the integrated MCU 50 compares the signal applied to the first reception unit 52 with the signal applied to the second reception unit 54 to synchronize the RPMs of the first motor 22 and the second motor 32. In addition, the signal of the first angle sensor 44 of the first motor 22 is applied to the third reception unit 56 of the integrated MCU unit 50, and the signal of the second angle sensor 48 of the second motor 32 is applied to the fourth reception unit 58 of the integrated MCU unit 50.

The second synchronization unit 62 of the integrated MCU unit 50 compares the signal applied to the third reception unit 56 with the signal applied to the fourth reception unit 58 to synchronize the rotational angles of the first motor 22 and the second motor 32.

As described above, the first motor 22 and the second motor 32 may be simultaneously controlled by the single integrated MCU 50 to precisely synchronize the first motor 22 and the second motor 32.

In addition, when a vehicle passenger manipulates the forward switch or the reward switch of the seat, the seat moves forward or reward. When the seat reaches the maximum forward position or the maximum reward position, the current values of the first motor 22 and the second motor 32 are applied to the integrated MCU 50 from the first current measurement unit 70 or the second current measurement unit 72. In this case, when the integrated MCU 50 compares the current value of the first motor 22 or the second motor 32 with the set current value, and determines that an overcurrent is generated in the first motor 22 or the second motor 32, the integrated MCU 50 stops driving of the first motor 22 and the second motor 32 at the same time.

Therefore, the first motor 22 and the second motor 32 are prevented from being overloaded, thereby preventing the first motor 22 and the second motor 32 from being damaged by a fire and stopping the seat without a separate limit sensor, thereby reducing the number of components.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention simplifies the structure by using a motor in each of two driving units in the forward and reward movements of an electric seat for a vehicle, and synchronizes the two motors using one integrated MCU to precisely operate the electric seat and prevent overload of the motors.

What is claimed is:

1. An electric seat control apparatus for a vehicle comprising:
    a first rail and a second rail mounted at a constant interval on a floor surface of a vehicle body in forward and rearward directions of a seat;
    a first movement unit provided with a first motor and mounted between the first rail and a lower surface of the seat to move linearly along the first rail;
    a second movement unit provided with a second motor and mounted between the second rail and the lower surface of the seat to move linearly along the second rail; and
    a control unit that simultaneously receives a first RPM and a rotational position signal of the first motor and a second RPM and a rotational position signal of the second motor to synchronize the first and second RPMs, and a first rotational position of the first motor and a second rotational position of the second motor to match each other.

2. The electric seat control apparatus for a vehicle of claim 1, wherein the control unit comprises:
    a first Hall sensor for measuring the first RPM of the first motor;
    a first angle sensor for sensing the first rotational position of the first motor;
    a second Hall sensor for measuring the second RPM of the second motor;
    a second angle sensor for sensing the second rotational position of the second motor; and
    an integrated micro controller unit (MCU) which receives all signals applied from the first Hall sensor, the second Hall sensor, the first angle sensor, and the second angle sensor, and synchronizes the first motor and the second motor such that the first and second RPMs and the first and second rotational positions of the first and second motors match each other.

3. The electric seat control apparatus for a vehicle of claim 2, wherein the integrated MCU is integrally provided with at least one of a gate driver, MOSFET, and SMPS.

4. The electric seat control apparatus for a vehicle of claim 2, wherein the integrated MCU comprises:
- a first reception unit for receiving a signal applied from the first Hall sensor;
- a second reception unit for receiving a signal applied from the first angle sensor;
- a third reception unit for receiving a signal applied from the second Hall sensor;
- a fourth reception unit for receiving a signal applied from the second angle sensor;
- a first synchronization unit for synchronizing the first and second rotational positions of the first motor and the second motor by comparing the first reception unit with the third reception unit; and
- a second synchronization unit for synchronizing the first and second RPMs of the first motor and the second motor by comparing the second reception unit with the fourth reception unit.

5. The electric seat control apparatus for a vehicle of claim 2, wherein the integrated MCU stops the first motor and the second motor when it is determined that an overcurrent is generated in the first motor or the second motor according to a signal applied from a first current measurement unit measuring a current of the first motor and a signal applied from a second current measurement unit measuring a current of the second motor.

6. A method of controlling an electric seat for a vehicle comprising the steps of:
- Receiving a first RPM and the first rotational position of a first motor by an integrated micro controller unit (MCU);
- receiving a second RPM and the second rotational position of a second first motor by the integrated MCU;
- comparing the first and second RPMs and the first and second rotational positions of the first motor and the second motor in the integrated MCU; and
- synchronizing the first and second RPMs and the first and second rotational positions of the first motor and the second motor in the integrated MCU.

7. The method of controlling an electric seat for a vehicle of claim 6, further comprising the steps of:
- receiving a first current value of the first motor by the integrated MCU;
- receiving a second current value of the second motor by the integrated MCU;
- comparing the first current value of the first motor with the second current value of the second motor in the integrated MCU; and
- simultaneously stopping the first motor and the second motor when at least one of the first motor and the first motor is determined to have an overload.

* * * * *